United States Patent [19]

Steel, III

[11] Patent Number: 4,471,926
[45] Date of Patent: Sep. 18, 1984

[54] TRANSFER VEHICLE FOR USE IN CONJUNCTION WITH A REUSABLE SPACE SHUTTLE

[75] Inventor: Robert W. Steel, III, Long Beach, Calif.

[73] Assignee: TRW Inc., Redondo Beach, Calif.

[21] Appl. No.: 351,071

[22] Filed: Feb. 22, 1982

Related U.S. Application Data

[63] Continuation of Ser. No. 089,012, Oct. 29, 1979, abandoned.

[51] Int. Cl.³ .................................................. B64G 1/26
[52] U.S. Cl. ................................ 244/158 R; 244/164; 244/169; 244/172
[58] Field of Search ................... 244/158 R, 164, 169, 244/172

[56] References Cited

U.S. PATENT DOCUMENTS 3,286,629  11/1966  Laue ..................................... 244/172
4,326,684   4/1982  Rosen ................................... 244/172

FOREIGN PATENT DOCUMENTS 1959282  6/1971  Fed. Rep. of Germany ...... 244/172
2850920  6/1979  Fed. Rep. of Germany ... 244/158 R Primary Examiner—Trygve M. Blix
Assistant Examiner—Ivy M. Shum
Attorney, Agent, or Firm—Robert W. Keller; Donald R. Nyhagen

[57] ABSTRACT

A spacecraft or transfer vehicle for transportation of a payload from a space shuttle parking orbit to a higher operation orbit, wherein the transfer vehicle utilizes housekeeping subsystems integrated into the payload, to avoid unnecessary duplication of these subsystems, for such functions as power supply, guidance, control, and communications. The transfer vehicle disclosed includes a propulsion system with at least one low-thrust bipropellant liquid rocket engine, to provide a "soft" or low-acceleration ascent, and employs two tanking stages, each having four propellant tanks, arranged symmetrically in a circular configuration. The first stage of four tanks is jettisoned during ascent, and the second stage, including the remaining four tanks, the rocket engine, and related supporting structure, is separated from the payload when the operational orbit is reached.

3 Claims, 8 Drawing Figures

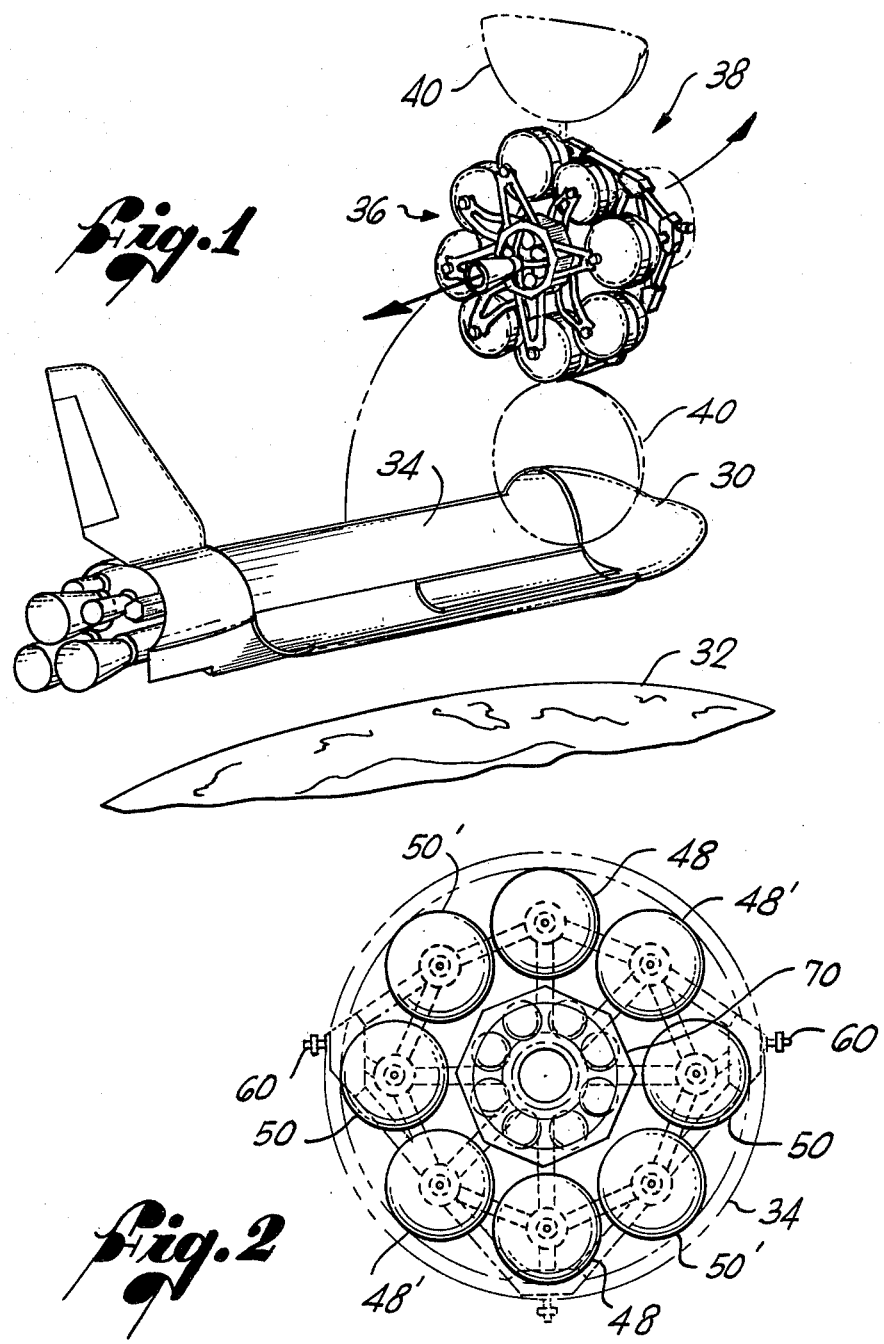

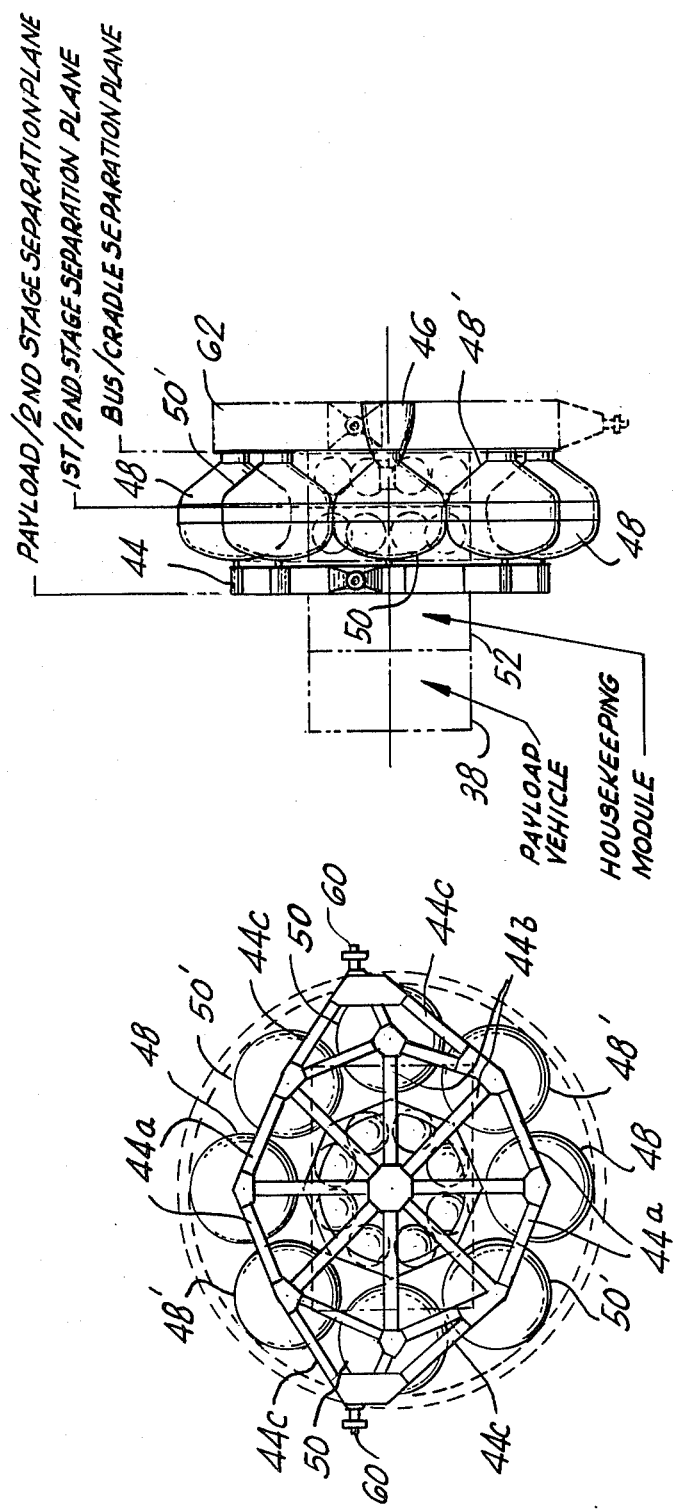

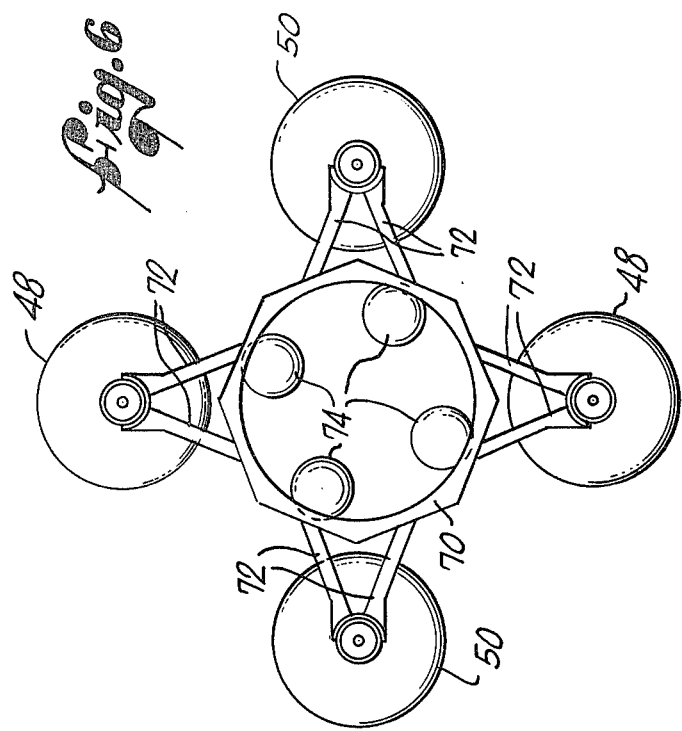
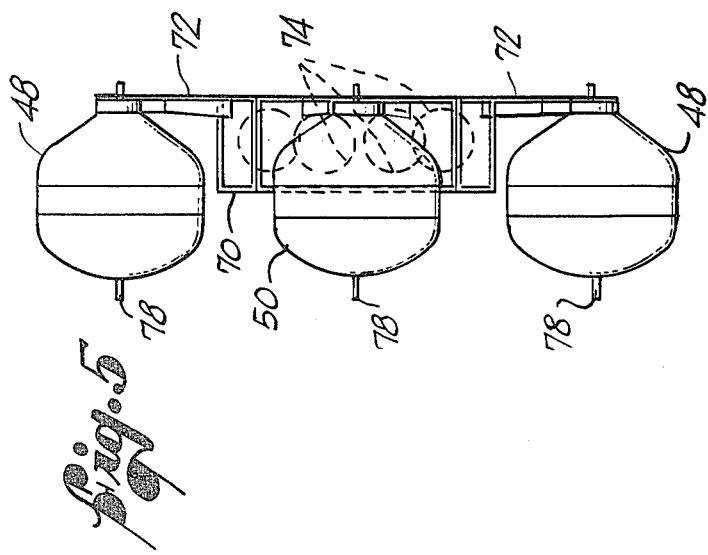

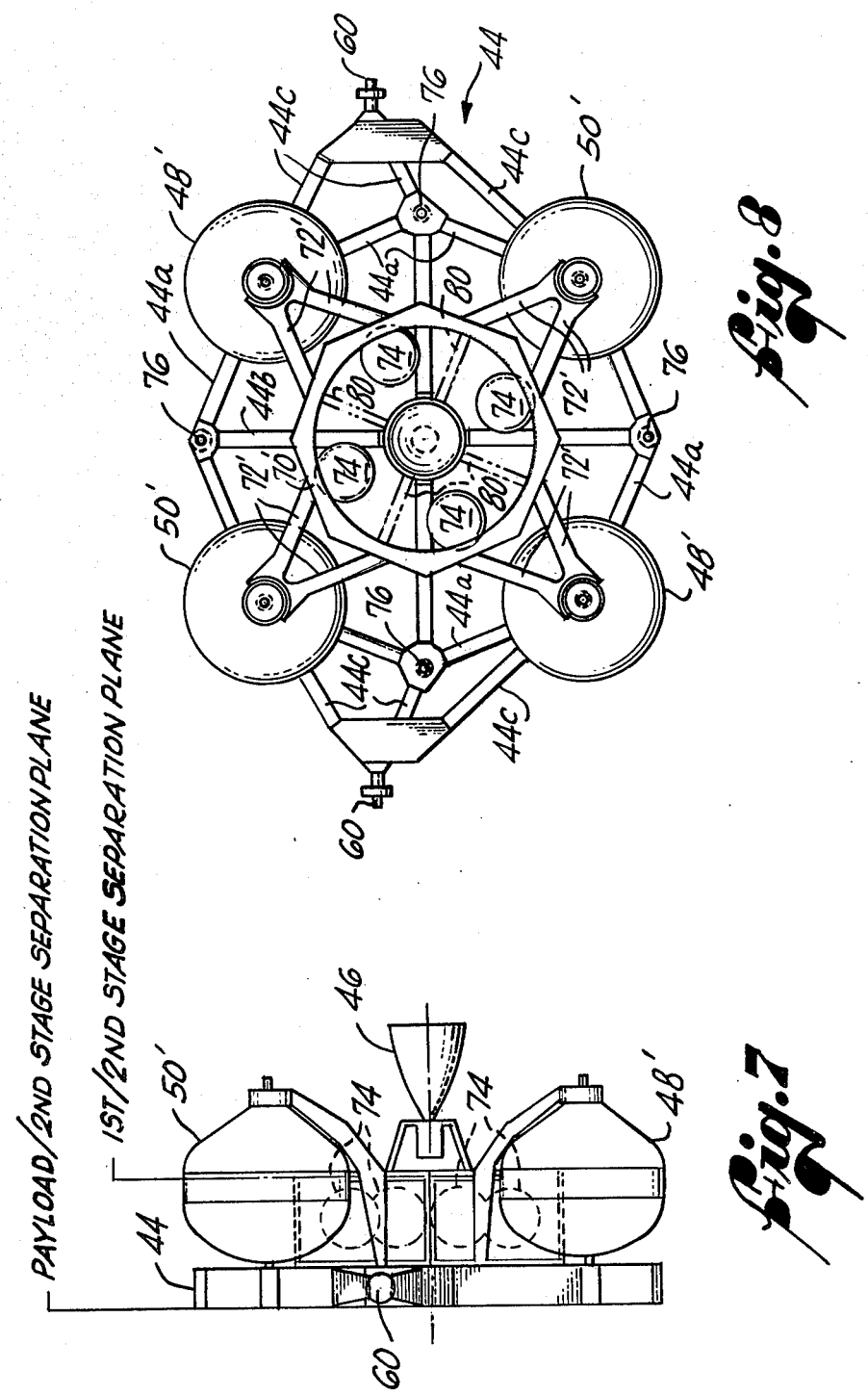

TRANSFER VEHICLE FOR USE IN CONJUNCTION WITH A REUSABLE SPACE SHUTTLE

This is a continuation, of application Ser. No. 089,012, filed Oct. 29, 1979 now abandoned.

RELATED APPLICATIONS

Reference is made to copending application Ser. No. 407,379, filed Aug. 12, 1982, and entitled Spacecraft For Use In Conjunction With Reusable Space Shuttle, assigned to the same assignee as the present application.

BACKGROUND OF THE INVENTION

This invention relates generally to space vehicles, and, more particularly, to spacecraft for carrying a payload, such as a satellite or space probe, from a first planetary orbit to a second operational orbit in which the payload will be used.

Since the inception of space flight, spacecraft such as communication satellites have been launched by means of expendable, rocket-powered vehicles, which were initially adaptations of vehicles used to carry ballistic missiles. These expendable rocket vehicles have imposed severe weight and size limitations on satellites and similar spacecraft. The same limitations will no longer apply, however, when a launch vehicle known as the space transportation system, or space shuttle, becomes operational. The space shuttle is a reusable vehicle about the size of a small jet airliner. It will be launched in a vertical orientation, like a rocket, using auxilliary rocket engines strapped to its fuselage, and will carry one or more satellites or other payloads in a payload bay up to a circular parking orbit at an altitude of approximately 160 nautical miles (300 km). For the return flight, the shuttle will first be slowed down by its own rocket engines, will re-enter the earth's atmosphere, and will land as a glider on a relatively long runway.

Although the space shuttle removes long-standing constrains on the weight and size of satellites, it also imposes new constraints, and poses new problems with respect to transporting a satellite or other spacecraft from the shuttle orbit to its operational orbit. The payload bay of the space shuttle is a generally cylindrical space approximately 60 feet (18.3 meters) long and 15 feet (4.6 meters) in diameter, and the cargo carrying capacity is approximately 65,000 pounds (29,480 kg). Typically, more than one user will share the shuttle on a single flight, and the cost of the mission to each user is determined from the greater of the weight ratio and the length ratio utilized by the user.

For example, if a user's payload, including an upper-stage propulsion system or transfer vehicle, occupied 15 feet (4.6 meters) of the length of the payload bay, and weighed 15,000 pounds (6,804 kg), the length ratio would be 15 divided by 60, or 25%, and the weight ratio would be 15,000 divided by 65,000, or approximately 23%. Accordingly, the user cost would be determined by the length ratio of 25%.

Clearly, the use of this cost formula encourages spacecraft designers to make the length and weight ratios approximately equal. For most satellite designs, the end result is that the satellite and accompanying propulsion system must usually be designed to be as short as possible to make best use of the payload bay.

An even more important consideration is that the space shuttle will provide transportation to only a relatively low altitude of approximately 160 nautical miles (300 km). Most satellite missions require payloads to be transported to much higher orbits than this. Communication satellites, for example, typically operate in a geosynchronous orbit, having a twenty-four-hour period of rotation, at approximately 19,000 nautical miles (35,000 km) altitude. Accordingly, a propulsion system must be provided to transport a payload, such as a satellite, from the parking orbit of the space shuttle to a higher operational orbit in which the satellite will operate.

Various configurations have been suggested for propulsion systems to transport such a payload to its operational orbit from the space shuttle. Prior to the present invention, however, all of the proposed propulsion systems have included a number of features that are disadvantages in the context of space shuttle operations. Basically, the designs suggested to date for transporting a satellite to its operational orbit all utilize essentially the same principles as an upper stage launch vehicle of the type widely used prior to the space shuttle. These upper stages, or payload assist modules as they are sometimes called, typically have a relatively large solid-propellant rocket engine, which is initially burned at perigee, the lowest altitude point in an elliptical transfer orbit, transferring the payload to an orbit having an apogee at the desired operational orbit altitude. Either the same engine, or a separate one on the satellite itself, is then burned at apogee to circularize the orbit at the desired altitude.

The principal disadvantage of this technique is that there is considerable unnecessary avionic equipment redundancy with respect to the upper-stage or payload assist module and the payload or satellite module itself. Each module is usually designed to be self-sufficient in terms of "housekeeping" functions, such as power supply, attitude and course control, telemetry and communication. The upper-stage or payload assist module functions as a self-sufficient spacecraft while in transition between the space shuttle orbit and the operational orbit, after which the satellite or payload module then also functions as a self-sufficient spacecraft, and may in fact be separated from the upper-stage module on arrival in the operational orbit. It will be apparent that this duplication of subsystems is extremely costly. It has apparently been thought to be necessary, however, to accommodate a wide range of missions for which the space shuttle will be utilized.

Another feature that all of the upper-stage module designs so far suggested have in common is that the ascent from the shuttle parking orbit to the satellite operational orbit is made with basically only two rocket engine burns. While this technique is known to be the most efficient from a fuel consumption standpoint, it imposes severe design constraints on the satellite, since relatively fragile structural components, such as communication antennas or solar cell arrays, must then be able to withstand substantial acceleration stresses if these components are to be deployed before departure from the vicinity of the space shuttle.

It will be appreciated from the foregoing that there is presently a clear need for a transfer vehicle suitable for transporting payloads, such as satellites, from a low parking orbit to a higher operational orbit without any of the aforementioned disadvantages. Ideally, such a transfer vehicle should also be easily adaptable to a variety of mission-specific requirements, and should provide a "soft ride" utilizing relatively low accelerations, so that satellite components can be safely deployed before departure from the vicinity of the space shuttle. The present invention is directed to these ends.

SUMMARY OF THE INVENTION

The present invention resides in a transfer vehicle for transporting a payload from a relatively low-altitude parking orbit to an operational orbit. A number of housekeeping functions common to both the transfer vehicle and the payload, such as telemetry and communication, attitude control, and power supply, are integrated into the payload in such a manner that no duplication of equipment is needed to provide these functions both while in the operational orbit and while in transition or ascent from the parking orbit to the operational orbit. Basically, and in general terms, the integrated transfer vehicle of the invention comprises a forward support structure including means for attachment of a variety of payload and housekeeping equipment modules in front of the structure, and a propoulsion system secured to the rear of the structure, including a relatively low-thrust bipropellant liquid rocket engine and a plurality of fuel and oxidizer tanks disposed about the engine.

In accordance with an important aspect of the invention, housekeeping subsystems for performing such functions as telemetry and communication, attitude control, and power supply are located with the payload, forward of the support structure, and not with the transfer vehicle, which is ultimately separated from the payload, to minimize the mass of the vehicle left in operational orbit, and to minimize heat transfer problems arising as a result of the presence of the transfer vehicle. The housekeeping subsystems are integrated to avoid unnecessary redundancy, and provide the housekeeping functions both while in the operational orbit and while in ascent from the parking orbit to the operational orbit. User requirements for specific missions dictate the particular design specifications for these housekeeping subsystems, which later become available for exclusive use by the payload, once the spacecraft reaches its operational orbit.

Although a number of features of the transfer vehicle of the invention must be selected or adapted for the specific requirements of a mission, the basic structural aspects, including at least one bipropellant liquid rocket engine, forward support structure, propellant tanks and housekeeping subsystems integrated into the payload, will be common to practically all missions utilizing the space shuttle.

In accordance with an important aspect of the invention, the propulsion system of the vehicle includes two expendable stages or sets of propellant tanks supplying the rocket engine. In the presently preferred embodiment of the invention, these two stages each comprise two fuel and two oxidizer tanks disposed symmetrically and at equal distances from the central axis and thrust line of the spacecraft. Even though the oxidizer material is considerably heavier than the fuel, balancing is achieved by positioning fuel and oxidizer tanks in diametrically opposed pairs, i.e. each pair of fuel tanks or oxidizer tanks is diametrically opposed. The fuel and oxidizer tanks are burned in pairs to preserve balance as the propellants are expended.

The second or final stage has its two fuel and two oxidizer tanks secured to the forward support structure, which includes a spider structure and a forward half of a central cylinder. The four tanks of the first stage are attached to the aft half of the central cylinder, which is separable from the forward half, and are secured to the forward spider structure by slip-type joints. The entire assembly of eight tanks forms a circular configuration about the engine, with each four-tank stage comprising two pairs of diametrically opposed tanks angularly spaced at ninety-degrees to each other. The forward spider structure includes a pair of forward sill trunnion attachments for engagement with a shoulder or sill in the payload bay of the shuttle. An aft cradle, having two aft sill trunnion attachments and a keel trunnion attachment supports the transfer vehicle and its payload from the rear and attaches to the payload bay at sill and keel positions.

When the space shuttle reaches its parking orbit, the payload bay doors are opened and the spacecraft, including the bus and its payload, is separated from the support cradle in the bay. Subsequently, after deployment of various payload components such as antennas and solar arrays, the spacecraft is separated from the space shuttle, is appropriately oriented, and its rocket engine is fired at a predetermined point in the orbit. Using a succession perigee burns, and at least one final apogee burn, the vehicle is transferred to its operational orbit. Initially, the propellants for the rocket engine are taken from the first-stage fuel and oxidizer tanks. When these have been emptied, the first stage is separated from the second stage and payload modules, and propellants are then delivered from the second-stage fuel and oxidizer tanks. When the spacecraft reaches its operational orbit, the remaining structure of the transfer vehicle, including the second-stage tanks, the rocket engine, and the forward support structure, it separated from the payload and its housekeeping subsystems. Small thruster rockets may be included in the payload module to provide for attitude control and course correction once the payload has been separated from the bus.

It will be appreciated from the foregoing that the present invention represents a significant advance in the field of spacecraft, such as satellites and other vehicles used in interplanetary exploration. The invention provides a novel means for transferring a spacecraft or satellite from a shuttle parking orbit to an operational orbit. The use of a two-stage tanking configuration with the tanks located to minimize the length of the vehicle, has the effect of reducing transportation charges for use of the space shuttle, and allows the use of a low-thrust liquid propellant rocket engine, for ascent to the operational orbit at relatively low acceleration rates. Other aspects and advantages of the invention will become apparent from the following more detailed description, taken in conjunction with the accompanying drawings.

BRIEF DESCRIPTION OF THE DRAWINGS

FIG. 1 is a simplified perspective view showing the transfer vehicle of the invention, together with its payload, after removal from a space shuttle (not drawn to the same scale as the transfer vehicle);

FIG. 2 is a rear end view of the transfer vehicle of the invention, showing the aft support cradle in broken lines;

FIG. 3 is a front end view of the transfer vehicle;

FIG. 4 is a side elevational view of the transfer vehicle;

FIG. 5 is a side elevational view of the first tank stage of the transfer vehicle;

FIG. 6 is a rear end view of the first tank stage;

FIG. 7 is a side elevational view of the second stage of the transfer vehicle; and FIG. 8 is a rear end view of the second stage.

DETAILED DESCRIPTION

As shown in the drawings for purposes of illustration, the present invention is concerned with a multipurpose transfer vehicle for transporting a payload, such as a communication satellite, from a relatively low parking orbit in which it was placed by a space shuttle vehicle, to an operational orbit, which in general will be a much higher altitude orbit around the earth, or an interplanetary trajectory.

In the near future, it will be possible to launch a spacecraft by first transporting it to a relatively low parking orbit inside a reusable vehicle known as a space shuttle. The space shuttle is about the size of a small jet airliner, which is launched in a vehicle orientation, like a rocket, and returns to earth by gliding into a long runway. While the space shuttle is in its parking orbit, doors in its fuselage will be opened and one or more shuttle payloads will be removed from the shuttle before it returns to earth. Although the low-altitude parking orbit is an ideal one for operation of the reusable space shuttle, it is unsuitable for most missions involving satellites or for interplanetary exploration. Accordingly, some means must be provided for transferring a payload vehicle to its final operational orbit.

The term "payload" is defined in a general sense as the useful load that a vehicle of transport can carry. It will be appreciated that the term has two distinct meanings in the context of the present invention. First, there is the payload that is delivered to the operational orbit. This may be a satellite, or other "payload vehicle", and is not intended to include the transfer vehicle used to transport the "payload" from the parking orbit to the operational orbit. An important aspect of this invention involves integrating and consolidating housekeeping subsystems such that common subsystems will be used both for the "payload vehicle" in operational orbit, and for the spacecraft used for transport from the parking orbit. Although this arrangement tends to confuse the issue of what the "payload" is, for purposes of this application the "payload" delivered to the operational orbit includes only those spacecraft components delivered to the operational orbit or trajectory that were not used solely in the transition from the parking orbit.

A second meaning of "payload" is intended, of course, when the term is used with reference to the space shuttle. Anything that the shuttle delivers to its parking orbit and is not needed for operation of the shuttle itself is part of its payload.

Suggested transfer vehicle designs prior to this invention basically require the use of fairly conventional upper rocket stages to carry the satellite or other payload vehicle to its higher operational orbit, or to effect injection into interplanetary space. However, such schemes require costly duplication of various housekeeping subsystems, for such functions as attitude control, power supply, and communications. Such upper-stage rockets or ascent modules also subject the payloads to relatively high accelerations during the transistion to the operational orbit, with the result that such structures as antennas and solar arrays cannot be deployed, or must be designed to withstand high acceleration forces.

It will be understood that the term "operational orbit", as used in this application is intended to encompass orbits around the earth, orbits around the moon, orbits around other planets or their satellites, and interplanetary trajectories.

In accordance with the present invention, an optimized transfer vehicle is provided to transport a payload vehicle, such as a satellite or other spacecraft, on any of a variety of missions, and the housekeeping subsystems for the payload vehicle and the transfer vehicle are integrated to avoid unnecessary duplication, and are located with the payload, to allow for jettisoning of te entire transfer vehicle once the operational orbit is reached.

By way of background, FIG. 1 shows a space shuttle, indicated by reference numeral 30, shown in a parking orbit around the earth, indicated at 32. The shuttle 30 has a payload bay 34 in which the transfer vehicle, indicated by reference numeral 36, is transported, together with a payload vehicle 38, which is shown as including antennas 40. The transfer vehicle 36 and payload vehicle 38 are shown immediately after removal from the shuttle payload bay 34. Since, in accordance with one aspect of the invention, the integrated spacecraft, comprising the bus transfer vehicle 36 and payload vehicle 38, is subjected to only very small accelerations, the antennas 40 and other similar components can be deployed as soon as the spacecraft is removed from the space shuttle 30.

FIGS. 2, 3 and 4 show the transfer vehicle 36 and its propulsion system in more detail. As shown in FIG. 4, for example, the transfer vehicle 36 includes a forward support spider structure 44, a centrally positioned rocket engine 46, and, in the preferred embodiment, four fuel tanks 48 and four oxidizer tanks 50. As will be explained in detail, the transfer vehicle employs two four-tank stages. For simplicity, the propellant tanks in the first stage will be referred to by numerals 48 and 50, for fuel and oxidizer tanks, respectively, and the tanks in the second stage will be referred to by numerals 48' and 50'. The payload vehicle 38 is indicated only diagrammatically in FIG. 4, and is shown to be positioned next to a housekeeping module 52, which houses various housekeeping subsystems to perform such functions as communication, telemetry, guidance, power supply, and so forth. Although this module 52 is shown as being separate from the payload vehicle 38, in fact it is part of the payload to be placed in the operational orbit by the propulsion subsystem 36, and there is sometimes no clear distinction between the payload vehicle and its housekeeping module.

In accordance with a principal aspect of the invention, the housekeeping subsystems contained within the module 52 are used both by the transfer vehicle 36 during ascent from the parking orbit to the operational orbit, and by the payload vehicle 38 itself while in the operational orbit. Unnecessary redundancy of such subsystems is therefore avoided, and considerable cost savings are effected.

The forward spider support structure 44 is best shown in FIG. 3 as including a rigid framework of eight straight members 44a of equal length, forming an octagonal structure of which the corners correspond to the centers of the fuel tanks 48 and 48' and the oxidizer tanks 50 and 50'. The support structure 44 also includes eight radial members 44b extending from the center of the structure to the corners of the octagon, and a pair of forward trunnion attachments 60 connected to the spider structure by means of two sets of three additional straight members 44c connected to three adjacent corners of the octagon on each side. The trunnion attachments 60 engage with shoulders or sills (not shown) on the walls of the payload bay 34, and transmit shear loads, in the plane of the support structure 44, to the space shuttle 30. Additional support in the payload bay 34 is provided by a support cradle 62 located at the aft end of the transfer vehicle 36. While shown only generally in the assembly views of FIGS. 2-4, the specific structure of the transfer vehicle 36 will become apparent from a discussion of the two separable stages shown in the other figures.

FIGS. 5 and 6 show the structure of the first stage of the transfer vehicle 36. In the context of this invention, the stages referred to are not rocket engine stages in the usual sense, but tanking stages, whereby two sets of four tanks are expended in succession and are jettisoned during the course of the ascent to the operational orbit, or during the interplanetary injection phase of an interplanetary mission. As shown in FIGS. 5 and 6, the first stage of the transfer vehicle comprises a central cylinder 70, which actually has an eight-sided external surface and a cylindrical central bore. Extending from this octagonal outer surface of the central cylinder 70 is a radial supporting structure for the fuel tanks 48 and oxidizer tanks 50. In the illustrative embodiment, the supporting structure comprises four pairs of structural legs 72 extending radially out from the central cylinder 70 and providing an end support for each of the fuel tanks 48 and oxidizer tanks 50. Disposed on the inside of the cylinder 70 are four pressurizing bottles 74 for maintaining the propellants appropriately pressurized.

As shown in FIGS. 7 and 8, the second stage of the transfer vehicle 36 includes the forward spider support structure 44, the rocket engine 46, the fuel tanks 48' and oxidizer tanks 50', and an additional or forward portion 70' of the central cylinder 70. Again, a radial supporting structure comprising four pairs of structural legs 72' extend from the outer surfaces of the cylinder 70' to the aft ends of the tanks 48' and 50'. In the second stage, however, the forward central cylinder 70' is disposed toward the forward ends of the tanks, and the legs 72' therefore extend rearwardly, as well as outwardly from the central cylinder, to reach and support the aft ends of the propellant tanks. Also as in the first stage, the central cylinder 70' houses four pressurant bottles 74'. The rocket engine 46 is supported by radial struts 80 within the central cylinder 70'. As already described, the propellant tanks are supported from the rear by the structural legs 72 and 72' attached to the central cylinder 70 and 70'. For tank support at the forward end, the forward spider support structure 44 includes holes 76 at each of the corners of the octagon that it forms, for engagement with pins 78 on the ends of the fuel and oxidizer tanks. When the first stage is assembled with the second, the fuel tanks 48 and oxidizer tanks 50 of the first stage are positioned between the tanks 48' and 50' of the second stage, to form a symmetrical arrangement of eight tanks disposed in a circular configuration.

After the transfer vehicle 36 and payload vehicle 38 are released from the payload bay 34, preparation is made for initiation of the transfer to the operational orbit. In particular, various antennas and other appendages associated with the payload vehicle are deployed prior to engine ignition. The engine is gimballed to allow its thrust to be directed up to five or six degrees from the normal thrust line, for purposes of attitude control. When the first stage of four tanks has been expended, the forward and aft portions of the central cylinder 70 and 70' are separated by conventional, means, such as pyrotechnic devices, and the first stage is jettisoned from the remainder of the vehicle. Subsequent burns then utilize the second stage tanks for fuel and oxidizer, until the second stage and the payload vehicle reach the desired operational orbit. Since the rocket engine develops only a relatively low thrust, low acceleration, typically between 0.1 g and 0.5 g, can be employed, ensuring that the various structural appendages of the payload vehicle will not be damaged during ascent to the operational orbit.

Once the operational orbit has been reached, the payload vehicle, together with the housekeeping subsystems within the module 52, can be separated from the transfer vehicle 36, by appropriate disconnection from the forward support structure including the spider structure 44 and the forward central cylinder 70'. Thus, the transfer vehicle 36, including the forward spider support structure 44, the forward central cylinder 70' and the remaining second-stage fuel tanks 48' and oxidizer tanks 50', are jettisoned from the payload vehicle 38 as a unitary structure. The payload vehicle 38 can then perform its desired mission unimpeded by the unnecessary additional mass of the transfer vehicle 36 and its propulsion system, and unaffected by possible heating effects created by the presence of the transfer vehicle. The payload vehicle 38 can also be provided with thrusters (not shown) for attitude control in its operational orbit, consistent with conventional practice in this regard.

The fuel and oxidizer tanks 48 and 50 can be varied in length to accommodate various payload weights and mission requirements, or the tanks can be only partially filled as required for a particular mission. The two portions of the central cylinder 70 and 70' are rigidly coupled before separation of the first stage, using standard releasable attachments incorporating matched sets of springs to facilitate separation of the of the first stage. At this central cylinder joint, two conventional in-flight disconnects (not shown) are necessary to separate the fuel and oxidizer lines running from the first stage propellant tanks to the engine. The aft portion of the central cylinder 70, on the first stage of the transfer vehicle 36, is attached to the aft support cradle 62 with releasable attachments, and separation springs are also provided to facilitate removal of the payload vehicle 38 and transfer vehicle 36 from the cradle and out of the shuttle bay 34.

The support cradle 62 functions to support the aft end of all eight of the propellant tanks 48, 48', 50 and 50', again using releasable attachments. This arrangement allows for the transfer of payload and transfer vehicle loads to the shuttle payload bay. The forward propellant tank attachments to the forward spider support structure 44 transfer only in-plane shear loads, and not longitudinal loads. In fact, the attachment means between the forward ends of the tanks and the forward spider support structure provide for a sliding motion in the longitudinal direction, and permit separation of the four first-stage tanks 48 and 50 simply by removal of pins 78 on the forward ends of the tanks from corresponding holes 76 in the forward spider support structure 44.

It will be appreciated from the foregoing that the present invention represents a significant advance in the field of spacecraft. In particular, it provides a novel technique for transferring a payload vehicle, such as a satellite or space exploration vehicle, from a shuttle parking orbit to an operational orbit or interplanetary trajectory. The use of two four-tank stages provides for a transfer vehicle of desirably short axial length, and yet symmetrical configuration. Moreover, the provision of housekeeping subsystems integrated with the payload vehicle and shared by the transfer vehicle avoids unnecessary redundancy of such subsystems and provides an efficient technique for the transfer phase of a mission. Although a particular embodiment of the invention has been described in detail for purposes of illustration, it will be appreciated that various modifications may be made without departing from the spirit and scope of the invention. Accordingly, the invention is not to be limited except as by the appended claims.

I claim:

1. A spacecraft comprising:

a transfer vehicle for transporting a payload from a parking orbit to an operational orbit, said transfer vehicle having front and rear ends, a forward support at said front end including a generally octagonal frame, a central, substantially cylindrical core having forward and aft separable segments, said forward segment being rigidly connected to the aft side of said forward support and said aft segment being releasably secured to said forward cylindrical segment, at least one relatively low-thrust liquid bipropellant rocket engine secured to said forward cylindrical segment, a first tank stage including two diametrically opposed fuel tanks and two diametrically opposed oxidizer tanks supported symmetrically about said engine and rigidly connected to said aft cylindrical segment, a second tank stage including two additional diametrically opposed fuel tanks and two additional diametrically opposed oxidizer tanks supported symmetrically about said engine, spaced between said first-stage tanks, and rigidly connected to said forward cylindrical segment;

a payload vehicle releasibly connected to said forward support for separation from said transfer vehicle at said operational orbit, said payload vehicle including an equipment module for providing spacecraft housekeeping functions both for said transfer vehicle during transition from the parking orbit to the operational orbit and for the payload vehicle when in its operational orbit; and said first tank stage is jettisoned after its propellant tanks have been emptied, and the payload vehicle and said housekeeping subsystems are separated from said forward support structure when said transfer vehicle reaches the operational orbit.

2. A spacecraft as set forth in claim 1, wherein: said forward support structure further includes a pair of attachments for transferring shear loads, in the plane of said structure, to corresponding supports in a reusable vehicle employed to carry said transfer vehicle and its payload to the parking orbit, and also includes means for supporting the forward ends of said first-stage propellant tanks prior to separation of said first stage.

3. A spacecraft as set forth in claim 2, and further including means for releasably coupling said transfer vehicle to an aft support cradle located in the reusable vehicle employed for transportation to the parking orbit.

* * * * *